Nov. 3, 1942.   D. C. SHARP   2,300,815
VALVE FOR PUMPS
Filed Aug. 4, 1930

Inventor
DUDLEY C. SHARP
Jesse R. Stone
Lester B. Clark
By
Attorneys

Patented Nov. 3, 1942

2,300,815

UNITED STATES PATENT OFFICE 2,300,815

VALVE FOR PUMPS

Dudley C. Sharp, Houston, Tex.

Application August 4, 1930, Serial No. 473,087

8 Claims. (Cl. 251—127)

My invention relates to pump valves and pertains particularly to valves employed in double-acting pumps such as are employed for the pumping of mud and slush in deep well drilling.

In pumps of this character, such as are now required in the drilling of deep wells, it is necessary to provide a valve which is adapted to withstand heavy pressures and an unusual amount of wear. In valves of this character it is found that parts which take up the shock and vibration of the pumps are subjected to constant wear so that the parts need very frequent replacement.

It is an object of my invention to provide a valve in which the wear is taken up by removable parts which may be easily replaced when worn.

It is also an object of the invention to provide a packing member which is so formed as to provide a seal at the proper time but which is not subjected to the pounding caused by the reciprocation of the valve in use and such as is ordinarily experienced by packing members on valves of this character.

I also desire to provide means to take up some of the shock caused by the pounding of the valve in use so that the life of the valve may be prolonged.

In the drawing herewith I have shown a preferred embodiment of the invention in which Fig. 1 is a side view partly in elevation and partly in central vertical section showing the construction of my device.

Figure 2:
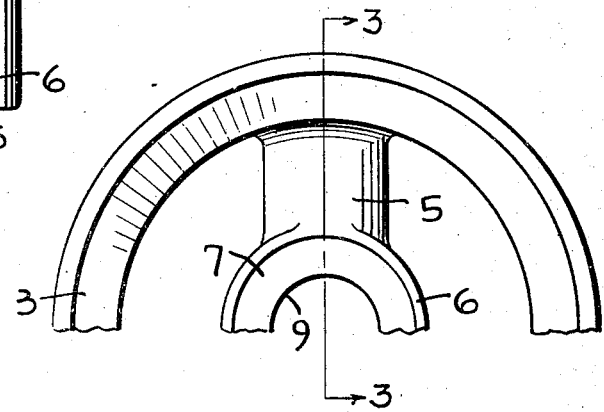
Fig. 2 is a top plan view of the seat portion of the valve.
Figure 3:
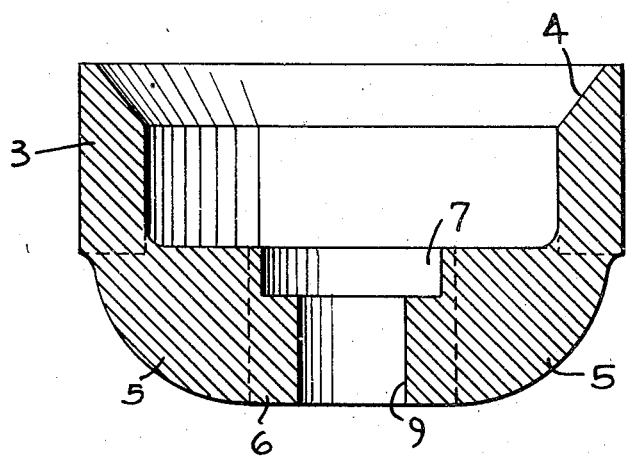
Fig. 3 is a transverse sectional view taken along the line 3—3 of Fig. 2.

My valve is adapted to be supported within an opening 1 in the frame 2 of the pump. The valve seat upon which the valve head is supported is shown at 3, said seat having a driving fit with the frame 2. The seat is ring-shaped, the upper end thereof being beveled to provide an inwardly and downwardly tapering seat face 4 for the valve. The lower side of the seat ring is provided with a transverse supporting spider 5, which, as shown in Fig. 2, extends diametrically across the seat ring and has a central boss or guide member 6 to receive the valve stem. The upper side of the bearing or guide 6 is recessed at 7 to receive a removable bushing or thimble 8.

The thimble 8 is a removable liner to fit within the opening 9 in the guide member. It may be made of hardened metal to take up the wear. It is supported within the opening 9 by a radial flange 10 at the upper end which fits within the recess 7 in the guide and is adapted to rest upon a cushion 11 of rubber or other similar resilient material which serves as a shock absorbing means to take up the shock of the valve during use. The upper surface of the thimble or bushing 8 is preferably beveled downwardly and outwardly at 12.

The valve includes a stem having an upper head 13 and a central stem 14 of slightly reduced diameter, the lower end of which is threaded at 15. Below the threaded portion the diameter of the stem is still further reduced to provide a guide member 16', which fits slidably within the guide bushing 8.

The threaded portion 15 of the stem acts to form a connection with a nut 16, which serves to clamp the packing members to the stem. Said packing members include an upper plate 17 and a lower plate 18, said plates serving to clamp between them the packing ring 19. The upper plate 17 comprises a central ring having intermediate its ends a radial flange 20. The outer margin of said flange is formed with a downwardly extending bead 21 to engage within a recess 22 in the packing ring. The lower end of the ring 17 is adapted to contact at 23 with the lower plate 18. Said lower plate is flattened on its upper and lower faces and has its outer surface tapered somewhat at 24 as will be seen from Fig. 1.

The packing ring 19 fits within the recess formed between the upper surface of the plate 18 and the lower surface of the flange 20 upon the upper plate. The recess 22 in the upper surface of the packing gasket receives the bead 21 on the upper plate and the ring is thus held firmly in position.

Figure 1:
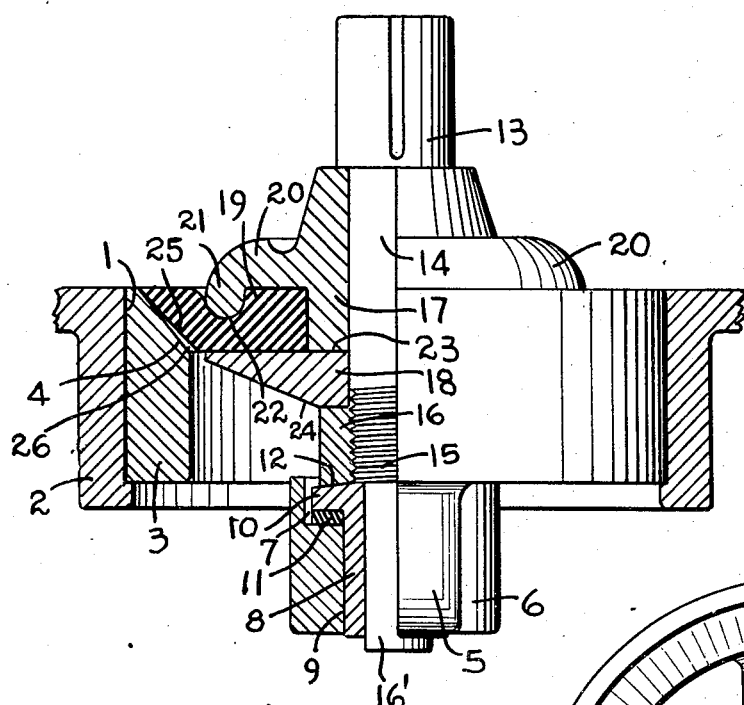

The outer sealing face of the packing ring 19 is tapered downwardly at 25 but as will be noted from Fig. 1 the taper upon the packing ring is more acute than the taper upon the seat so that the lower edge of the packing ring is spaced slightly from the seat 4 to provide a slight space indicated at 26.

It is to be understood that the packing gasket may be made of rubber or any similar composition which is flexible in its composition and adapted to resist wear.

In the operation of a valve constructed in accordance with my invention the valve will be given a reciprocating motion on its seat due to the action of the pump in the usual manner. As the valve comes down upon its seat the lower side of the nut 16 will strike the thimble or bushing 8 to take up the shock of the downward movement of the valve and I may so adjust the position of the nut 16 that the lower end thereof will strike the upper portion 12 of the bushing at the same time that the outer margin of the packing gasket 19 contacts with the seat, as shown in Fig. 1. The weight of the fluid above the valve will be taken up by the bushing 8, but the fluid bearing against the outer margin of the packing gasket will force it into sealing contact with the seat without exerting any undue strain or pounding upon the gasket.

It will be obvious that when the bushing 8 or the cushion 11 have become worn they may be very readily replaced by new parts so that if a valve becomes worn at this point the larger portion of the valve will be retained without the necessity of replacing the complete valve. It is also an advantage in my valve that a tight seal may be obtained between the packing gasket and the seat without undue wear upon the packing. This is done due to the particular shape and formation of the packing gasket which will be understood from the showing in Fig. 1. When the bushing 8 and the nut 16 come in contact the enormous back pressure on the valve is absorbed. In the types of slush pumps now in general use the back pressure will vary from 20,000 to 50,000 pounds on the valve. When this pressure is absorbed by the removable bushing the packing or gasket serves merely to create a seal by a very slight movement. So long as this movement is within the elastic limit of the packing material it will not be fatigued or unduly stressed with the result that it will afford immeasurable service. I have therefore provided a simple type of valve which will be enabled to endure the heavy strains to which it is subjected and will last for a long period of time before replacement is necessary.

While I have shown and described the invention as applied to the type of valve and seat having the cross brace 5 which serves as one means of guiding the valve in its travel, it is to be understood that the invention may be readily applied to other types without departing from the spirit thereof, which includes broadly the idea of taking the thrust of the fluid under pressure from the flexible packing or gasket and absorbing it through a more substantial contact of the valve body with the valve seat or some portion thereof.

What I claim as new is:

1. A valve including a seat ring, a seat thereon tapered downwardly and inwardly, a supporting guide member, a removable guide bushing in said guide, a valve stem slidable in said bushing, upper and lower plates on said stem, a nut to clamp said plates together, said nut being adapted to seat on said bushing, and a flexible packing gasket between said plates adapted to contact with said seat, said gasket being tapered on its outer margin at a steeper angle than said seat, whereby it contacts with said seat on the outer margin first when said nut seats on said bushing.

2. A valve including a seat ring, a seat thereon tapered downwardly and inwardly, a supporting guide member, a removable guide bushing in said guide, a valve stem slidable in said bushing, upper and lower plates on said stem, a nut to clamp said plates together adapted to seat on said bushing, shock absorbing means on said support for said bushing, and a flexible packing gasket between said plates adapted to contact with said seat.

3. A valve including a seat ring, a seat thereon tapered downwardly and inwardly, a supporting guide on said ring, a removable guide bushing in said guide, an outwardly sloping upper end on said bushing, a valve stem slidable in said bushing, upper and lower plates on said stem, a nut to clamp said plates together adapted to seat on said bushing, shock absorbing means on said support for said bushing, and a flexible packing gasket between said plates adapted to contact with said seat.

4. A pump valve including a valve ring adapted to be supported in a pump body, a downwardly and inwardly inclined seat at the upper end of said ring, a valve stem, upper and lower valve plates thereon formed to pass through said ring, a downwardly tapered packing gasket between said plates, said gasket being of greater diameter than said plates to project above said seat, and removable wear-resisting stop means to stop the closing movement of said valve before said gasket seals upon said seat, whereby the fluid pressure above said gasket will act to then force the same into sealing engagement.

5. A pump valve including a valve ring adapted to be supported in a pump body, a seat at the upper end of said ring, a valve stem, upper and lower valve plates thereon formed to pass through said ring, a packing gasket between said plates, said gasket being of greater diameter than said plates to project above said seat, but fitting entirely within the contour of said seat when closed, and removable wear-resisting stop means supported upon said valve ring to stop the closing movement of said valve before said gasket is forced by said plates upon said seat, said stop means acting to take the wear of closing of the valve and to prevent pounding of said gasket on said seat.

6. In a high pressure pump, a body, a valve ring mounted therein, an inner downwardly-tapered seat on said ring, a valve stem, clamping plates on said stem, a gasket between said plates and having a downwardly tapered outer margin to engage entirely within said seat, said margin being tapered at a more obtuse angle than said seat so that said outer margin of said gasket will first engage said seat, and means on said valve ring to stop said valve with the outer edge only of said gasket engaging said seat.

7. In a high pressure pump, a body, a valve ring supported therein, an upper steeply tapered seat on said ring, a valve stem, valve plates thereon, a packing gasket between said plates and projecting above said seat, the lower margin of said gasket being tapered more obtusely than said seat, a removable stop member on said valve ring, and means formed to move with said valve stem and rigidly connected therewith to engage said stop member and adapted to limit the closing movement of said valve before said gasket fully seals upon said ring and with the outer edge only in contact with said seat and take the shock of closing from said gasket before said valve is sealed.

8. A valve for high pressure pumps including a seat ring for positioning in the pump, a tapered seat thereon, a valve member including a body, a seal ring carried by said body and projecting above the seat, a lower face on said seal ring tapered at a more obtuse angle than said seat, a removable stop member carried by said seat ring to stop said valve member as the outer margin of said seal ring first engages said seat so that the shock of stopping said valve occurs before said seal ring contacts fully with said seat.

DUDLEY C. SHARP.